(12) United States Patent
Nolan

(10) Patent No.: US 6,399,030 B1
(45) Date of Patent: *Jun. 4, 2002

(54) COMBINED FLUE GAS DESULFURIZATION AND CARBON DIOXIDE REMOVAL SYSTEM

(75) Inventor: Paul S. Nolan, North Canton, OH (US)

(73) Assignee: The Babcock & Wilcox Company, New Orleans, LA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/326,450

(22) Filed: Jun. 4, 1999

(51) Int. Cl.$^7$ .............................. B01D 50/34; F01N 3/00
(52) U.S. Cl. ...................... 422/172; 422/168; 422/169; 422/170; 422/171; 422/193; 422/194; 422/236
(58) Field of Search ................................ 422/171, 168, 422/170, 187, 188, 169, 172, 193, 194, 236; 210/248, 299; 222/108, 109

(56) References Cited

U.S. PATENT DOCUMENTS

| 3,961,018 | A | * | 6/1976 | Williamson | 422/228 |
| 4,436,532 | A | * | 3/1984 | Yamaguchi et al. | 48/209 |
| H1499 | H | * | 11/1995 | Vance | 55/446 |
| 5,693,297 | A | * | 12/1997 | Turner et al. | 423/210 |
| 5,724,805 | A | | 3/1998 | Golomb et al. | 60/39.02 |

OTHER PUBLICATIONS

"Environmental Control Technology for Atmospheric Carbon Dioxide—Final Report," A.S. Albanese and M. Steinberg, Brookhaven National Laboratory Report BNL 51116, UC–11, for the U.S. Department of Energy, Sep. 1979, pp. iii,iv,v, and 1–51.

Acid Gas Removal: J.L. Chadwick et al., SRI International Report No. 24 for the Energy Technology Economics Program (ETEP), Jul. 1981, pp. 21–29 and 37.

"$CO_2$ Recovery from Flue Gas," C.R. Pauley, *Chemical Engineering Progress*, May 1984, pp. 59–62.

"Economics of Recovering $CO_2$ from Exhaust Gases," D.B. Miller, T.J. Soychak, and D.M. Gosar, *Chemical Engineering Progress*, Oct. 1986, pp. 38–46.

"A Study on the Systematic Control of $CO_2$ Emissions from Fossil Fuel Power Plants in the U.S.," H.C. Cheng and M. Steinberg, *Environmental Progress*, 5(4), pp. 245–255, (1986).

*Carbon Dioxide Removal from Coal–fired Power Plants*, C. Hendriks, Kluwer Academic Publishers, Dordrecht, Netherlands, 1994, pp. 19–49.

(List continued on next page.)

Primary Examiner—Marian C. Knode
Assistant Examiner—Alexa A. Doroshenk
(74) Attorney, Agent, or Firm—Eric Marich; Kathryn W. Grant

(57) ABSTRACT

A combined removal system for separating carbon dioxide and sulfur oxide gases from furnace flue gases employs a single vessel having two chambers. The chambers are separated by a series of baffles and drains. The lower, primary chamber contains reagent and a delivery system for removing sulfur oxides ($SO_2$ and $SO_3$) from the flue gases. The upper, secondary chamber has a reagent, typically an amine solution, for removing carbon dioxide from the flue gases. The baffles and drains permit the flue gases to rise from the primary chamber into the secondary chamber, while collecting the amine solution which is used to trap the carbon dioxide. Alternatively, the primary and secondary chambers may be separated by a horizontal segment or a combination of horizontal and vertical sections.

14 Claims, 2 Drawing Sheets

OTHER PUBLICATIONS

Financial Implications on Power Generation Costs Resulting from the Parasitic Effect of $CO_2$ Capture Using Liquid Scrubbing Technology from Power Station Flue Gases, C.L. Leci, *Energy Conversion Management*, 37 (6–8), pp. 915–921, (1996).

"$CO_2$ Capture, Reuse, and Storage Technologies for Mitigating Global Climate Change", H. Herzog, E. Drake, and E. Adams, A White Paper Final Report from the Massachusetts Institute of Technology Energy Laboratory for the U.S. Department of Energy, Jan., 1997.

KRC Umwelttechnik brochure, "Flue Gas Desulfurization" believed to be circa mid 1980's, by KRC Umwelttechnik GmbH, Germany, 4 pages, illustrates "separating bowl" concept used to separate FGD scrubber slurries at differing pH.

KRC Umwelttechnik brochure, "Desulfurization, Denitrification, Disposal", date unknown, by KRC Umwelttechnik GmbH, Germany, 5 pages, illustrates "separating bowl" concept used to separate FGD scrubber slurries at differing pH.

* cited by examiner

COMBINED FLUE GAS DESULFURIZATION AND CARBON DIOXIDE REMOVAL SYSTEM

FIELD AND BACKGROUND OF THE INVENTION

1. Field of the Invention

The present invention relates generally to the field of industrial power plant furnace and boiler systems and, in particular, to a new and useful apparatus and method for reducing or removing carbon dioxide ($CO_2$) and sulfur oxides ($SO_2$ and $SO_3$) from flue gases exiting such systems.

2. Description of the Related Art

Processes and devices for removing specific contaminant gases such as carbon dioxide or sulfur oxides from power plant systems have generally been known for many years, including open spray towers, packed towers, and tray towers. Known apparatus for separating these gases from the flue gas streams exiting the furnace systems requires first removing the sulfur oxides at a first location and then removing the carbon dioxide gases at a second location. The separation of steps is necessary because of undesirable reactions between the components of the different separation and removal systems.

Commonly, amines such as monoethanolamine (MEA), diethanolamine (DEA), and methyldiethanolamine (MDEA) are used to capture carbon dioxide from flue gases exhausting from fossil fuel power systems. Unfortunately, sulfur dioxide ($SO_2$) degrades these amines and inhibits the carbon dioxide removal. This is why carbon dioxide and sulfur oxide separation in current systems takes place in two separate steps in two different vessels.

Articles discussing known separation techniques include: Albanese, A. S. and M. Steinberg, "Environmental Control Technology for Atmospheric Carbon Dioxide—Final Report," Brookhaven National Laboratory Report BNL 51116, UC-11, for US DOE, September 1979; Chadwick, J. L., "Acid Gas Removal," SRI International Report No. 24 for Energy Technology Economics Program, July 1981; Pauley, C. R., "$CO_2$ Recovery from Flue Gas," Chemical Engineering Progress, May 1984; Miller, D. B., T. J. Soychak and D. M. Gosar, "Economics of Recovering $CO_2$ from Exhaust Gases," Chemical Engineering Progress, October 1986; Cheng, H. C. and M. Steinberg, "A Study on the Systematic Control of $CO_2$ Emissions from Fossil Fuel Power Plants in the U.S.," Environmental Progress, Vol. 5, No. 4, November 1986; Hendriks, C., *Carbon Dioxide Removal from Coal-Fired Power Plants,* Kluwer Academic Publishers, Dordrecht, Netherlands 1994; Leci, C. L., "Financial Implications on Power Generation Costs Resulting from the Parasitic Effect of $CO_2$ Capture Using Liquid Scrubbing Technology from Power Station Flue Gases," Energy Conversion Management, Vol. 37, Nos. 6–8, 1996; and Herzog, H., E. Drake and E. Adams, "$CO_2$ Capture, Reuse, and Storage Technologies for Mitigating Global Climate Change," White Paper Final Report, MIT Energy Laboratory for US DOE, January 1997.

It is clear that there is a need to separate both carbon dioxide and sulfur dioxides from flue gases, as expressed in several of the articles. However, a combined unit which can effectively separate both types of contaminants from flue gas flows has not been available.

SUMMARY OF THE INVENTION

It is an object of the present invention to provide a single vessel for capturing both carbon dioxide and sulfur oxides from power plant flue gases.

It is a further object of the invention to provide a separation vessel which combines the two gas separation processes without interference of one process with the other.

It is a further object of the invention to provide a simple, mechanical separator between the gas separation processes within the vessel.

Accordingly, a combined removal system for separating carbon dioxide and sulfur oxide gases from furnace flue gases is provided within a single vessel having two chambers. The chambers are separated by a series of baffles and drains. Additionally, a series of droplet separators, also known as mist eliminators or moisture separators, may be used as a further separation means. The primary chamber contains reagents and a delivery system for removing sulfur oxides ($SO_2$ and $SO_3$) from the flue gases. The secondary chamber has reagents for removing carbon dioxide ($CO_2$) from the flue gases. The baffles and drains permit the flue gases to pass from the primary chamber into the secondary chamber, while collecting an amine solution used to trap carbon dioxide. Alternatively, the primary and secondary chambers may be separated by a horizontal segment or a combination of horizontal and vertical sections.

The use of baffle systems for solid particulate removal and collection of condensate from gas flows in various sections of a furnace or boiler is known. However, the present inventor is not aware of baffle systems being used to separate chambers of a single vessel gas separation unit of the type described herein; i.e., a single unit containing means for separating both gases from the flue gas flow.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
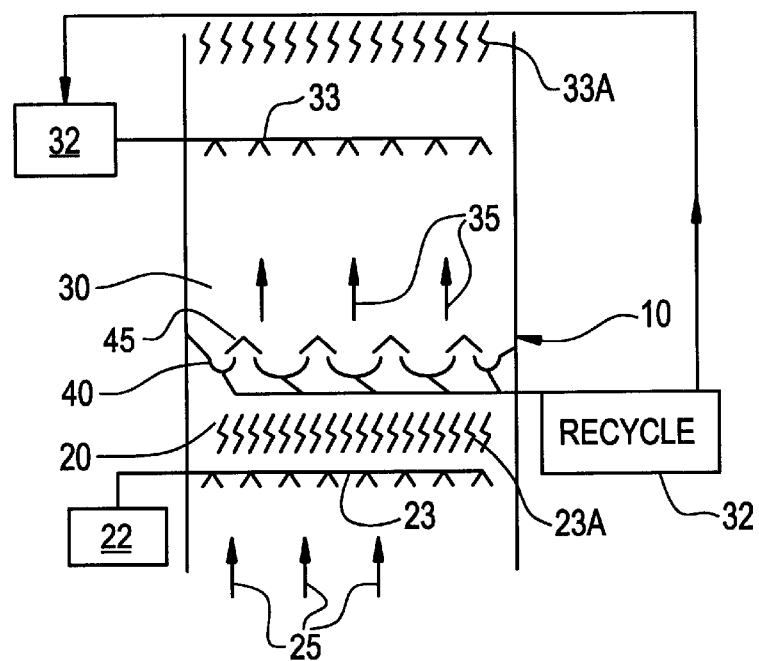
FIG. 1 is a side sectional elevational view of a separation vessel according to the invention.

Referring now to the drawings, in which like reference numerals are used to refer to the same or functionally similar elements, FIG. 1 shows the interior of a portion of a separation vessel 10 having a primary chamber 20 for removing sulfur oxides from a forced flow flue gas 25 and a secondary chamber 30 for removing carbon dioxide from the resulting sulfur oxide-free flue gas 35.

The primary chamber 20 has a spray header 23 for distributing a sulfur-removing first reagent liquor 22 into the primary chamber 20 from a source of the sulfur-removing first reagent liquor. The first reagent liquor 22 mixes and interacts with the flue gas 25 and causes the sulfur contaminants to be removed from the gas 25. The first reagent liquor 22 can be recycled in a known manner currently used in flue gas desulfurizers.

The upper chamber 30 has a second spray header 33 for distributing a carbon dioxide-removing second reagent into the upper chamber 30 from a source 32, such as monoethanolamine (MEA), diethanolamine (DEA) and methyldiethanolamine (MDEA). The second reagent 32 passes through the desulfurized flue gas 35 and interacts with the flue gas 35 to remove carbon dioxide.

In order to permit recycling and to prevent degradation of the second reagent 32, a series of baffles 45 and drains 40 are positioned across the interior portion of the vessel 10. The baffles 45 and drains 40 are horizontally overlapping but vertically spaced from each other, in a vertically oriented system, so that the flue gas 35 may pass between the baffles 45 and drains 40. The second reagent 32, with the carbon dioxide absorbed therein, will drop onto the tops of the baffles and be directed into the drains for removal and recycling without contacting the first reagent 22 and sulfur oxides. One or both of the drains 40 and baffles 45 may be oriented at an inclined angle toward a front or back wall of the vessel 10 to improve drainage of the second reagent 32 from the vessel 10 for recycling.

Figure 2:
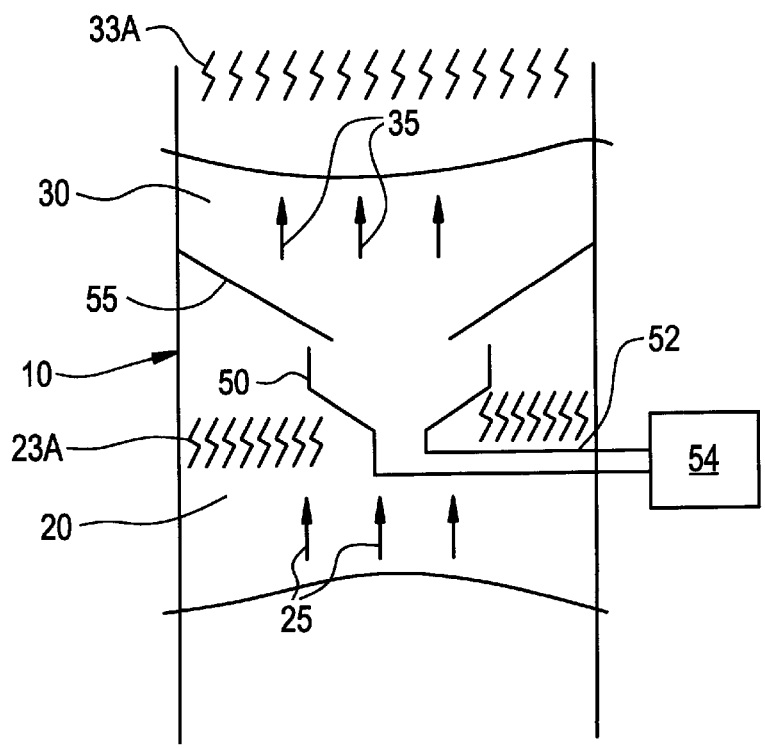
FIG. 2 is a side sectional elevational view of a second embodiment of the separation vessel.

Alternatively, a single trough or bowl 50 and pair of baffles 55 may be used, as shown in FIG. 2. As with the baffles 45 and drains 40 of FIG. 1, the baffles 55 horizontally overlap the edges of trough 50, while having a vertical gap between them. The trough 50 may drain from a lower end through pipe 52 to a collection header 54, from where reacted second reagent 32 may be sent to a recycling process.

Additionally, a first and second set of droplet separators 23A, 33A, respectively, may also be added to further enhance the efficiency of the system. Flue gas passing through the system may entrain droplets with it. Efficient droplet separation from the desulfurized flue gas is essential to prevent reagent carryover, as well as to stop corrosion and deposition downstream, either in the vessel or beyond it. However, it is possible to practice the present invention without some or all of these droplet separators, provided that adequate droplet separation is achieved by the baffle means, proper physical spacing between the chambers, gravity and natural agglomeration, or other means known to those skilled in the art. The degree of droplet separation required can be very small to non-existent for low flue gas velocity and large droplet size conditions, although for higher velocities and smaller droplet sizes the need for droplet separation increases.

Thus, first droplet separator 23A may be added downstream from the series of baffles 45 in a baffled system. If a bowl and trough system is employed, first droplet separator 23A may be added downstream from trough 50. Additionally, second droplet separator 33A may be added upstream from second spray header 33 in both configurations (i.e., the baffle and drain system or the bowl and trough system). Both the first and second droplet separators 23A and 33A may consistent of mesh pads, chevron-shaped moisture separators, or any method known to those skilled in the art.

Figure 3:
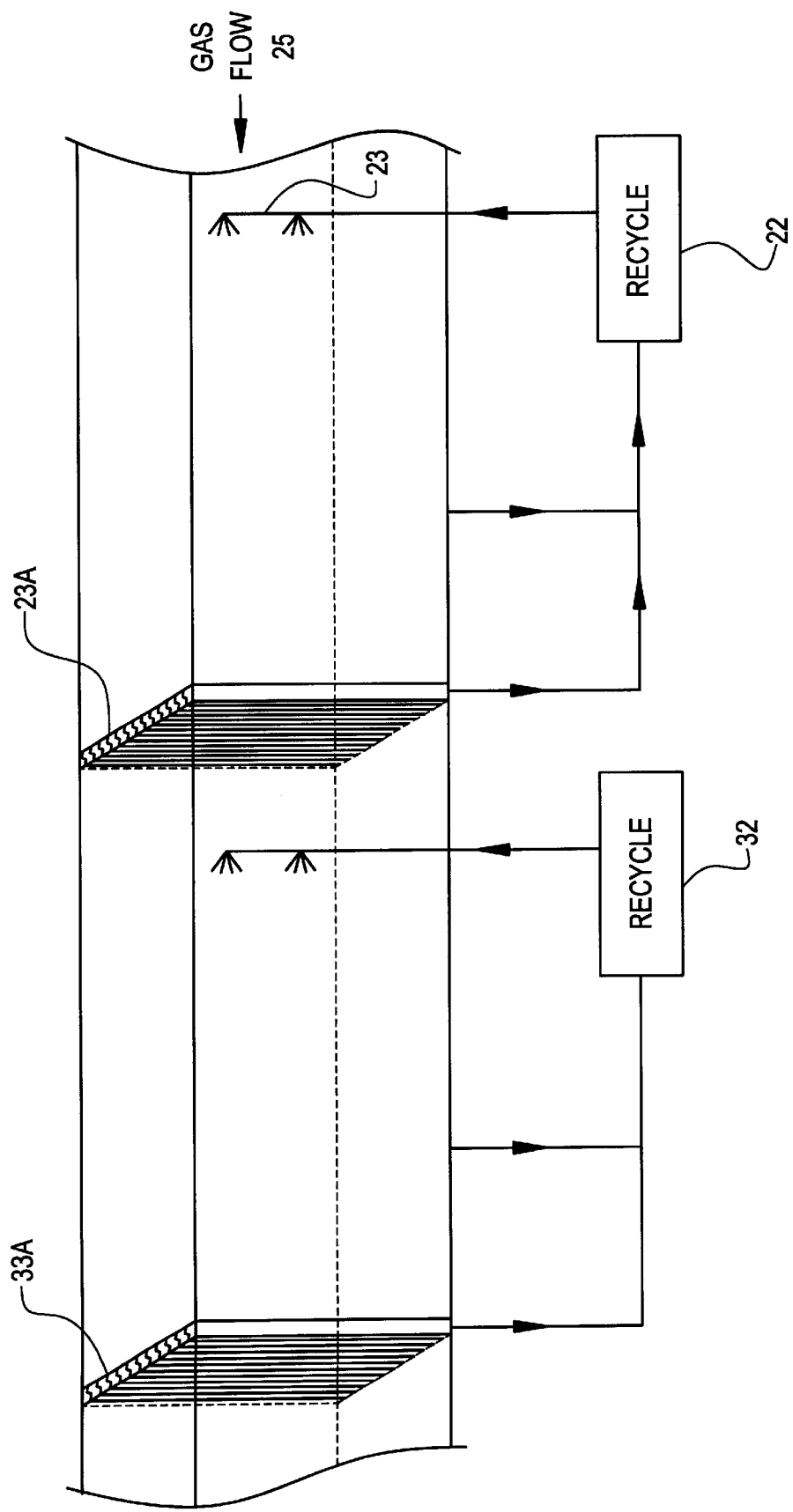
FIG. 3 is a side sectional elevational view of another embodiment of the separation vessel.

It is also envisioned that the chambers 20, 30 could be oriented horizontally, if space considerations require, as seen in, FIG. 3. In such a case, the baffles 45 and drains 40 or other separator would be oriented accordingly, with horizontal gaps and vertically overlapping sections, to separate the process liquors used to remove the contaminant gases in the respective chambers 20, 30. Again, the first and second droplet separators 23A, 33A may also be added and positioned relative the flue gas flow as discussed above.

While a specific embodiment of the invention has been shown and described in detail to illustrate the application of the principles of the invention, it will be understood that the invention may be embodied otherwise without departing from such principles.

I claim:

1. A combined desulfurizing and carbon dioxide removal system for sequentially removing sulfur oxides and carbon dioxide from a flue gas, the removal system comprising:

a single vessel having a primary chamber and a secondary chamber;

desulfurizing means for distributing a sulfur-removing first reagent into the primary chamber for removing sulfur oxides from the flue gas passing through the primary chamber;

carbon dioxide-removing means, downstream of the desulfurizing means, for distributing a carbon dioxide-removing second reagent selected from the group consisting of monoethanolamine (MEA), diethanolamine (DEA), and methyldiethanolamine (MDEA) in the secondary chamber for removing carbon dioxide from flue gas passing through the secondary chamber;

at least one pair of baffles, connected to the walls of the vessel between the secondary and primary chambers, each of the pair of baffles having a free edge spaced horizontally from a free edge of the adjacent baffle forming a horizontal gap therebetween; and at least one drain having side edges which are wider apart than the horizontal gap, the side edges of each at least one drain positioned spanning each horizontal gap, the at least one drain being vertically spaced from the at least one pair of baffles to form a vertical gap therebetween, the baffles and at least one drain arranged such that the carbon dioxide-removing second reagent distributed by the carbon dioxide-removing means is prevented from entering the primary chamber, while permitting flue gas with sulfur oxides removed therefrom to enter the secondary chamber.

2. The removal system according to claim 1, further comprising a first means for separating droplet entrainment positioned within the vessel, adjacent to the means for separating the secondary chamber and the primary chamber and the desulfurizing means.

3. The removal system according to claim 2, further comprising a second means for separating droplet entrainment positioned within the vessel, adjacent to the carbon dioxide-removing means.

4. The removal system according to claim 2, wherein the first means for separating droplet entrainment comprises a moisture separator.

5. The removal system according to claim 1, wherein the at least one drain is a trough.

6. The removal system according to claim 1, wherein the at least one pair of baffles are inclined downwardly toward the at least one drain.

7. The removal system according to claim 1, wherein the at least one pair of baffles comprises a series of baffles forming a plurality of horizontal gaps between each adjacent pair of baffles and wherein the at least one drain comprises a series of drains being positioned spanning each horizontal gap and vertically spaced from the baffles.

8. Apparatus for sequentially removing sulfur oxides and carbon dioxide contained in a flowing flue gas produced from the combustion of fossil fuels comprising:

a single vessel having a primary chamber and a secondary chamber downstream of the primary chamber;

means for contacting the flue gas in the primary chamber with a first reagent liquor for removing sulfur oxides;

means for contacting the flue gas in the secondary chamber with a second reagent degradable by sulfur oxides, for removing carbon dioxide; and means for capturing the second reagent and preventing the second reagent from contacting the flue gas in the primary chamber, while permitting the flue gas to flow therethrough; and wherein the means for capturing the second reagent further comprises at least one drain and a plurality of baffles arranged downstream of the at least one drain, and wherein the at least one drain and baffles are arranged across the vessel in a direction substantially perpendicular to direction of the gas flow and wherein the baffles and at least one drain are horizontally overlapping but vertically spaced apart from each other so that flue gas may pass between the baffles and the at least one drain.

9. The apparatus of claim 8, wherein the plurality of baffles and at least one drain are located at a top of the primary chamber.

10. The apparatus of claim 8, wherein the means for contacting the flue gas in the primary chamber with a first reagent liquor comprises a first spray header and the means for contacting the flue gas in the secondary chamber with a second reagent comprises a second spray header, and wherein the apparatus further comprises a first droplet separator located above the first spray header.

11. The apparatus of claim 10, further comprising a second droplet separator located above the second spray header.

12. The apparatus of claim 11, wherein the second reagent is selected from the group consisting of monoethanolamine (MEA), diethanolamine (DEA), and methyldiethanolamine (MDEA).

13. A method for sequentially removing sulfur oxides and carbon dioxide from a flowing flue gas produced from the combustion of fossil fuels comprising:

introducing the flue gas into a single vessel having a primary chamber and a secondary chamber downstream of the primary chamber;

contacting the flue gas in the primary chamber with a first reagent liquor for removing sulfur oxides;

contacting the flue gas in the secondary chamber with a second reagent degradable by sulfur oxides, for removing carbon dioxide;

providing means for capturing the second reagent and preventing the second reagent from contacting the flue gas in the primary chamber while permitting the flue gas to flow therethrough; and wherein the means for capturing the second reagent comprises at least one drain and two or more baffles, the at least one drain and baffles disposed between the primary chamber and the secondary chamber with the baffles downstream of the at least one drain, and wherein the at least one drain and baffles overlap in a direction perpendicular to the flue gas flow.

14. The method of claim 13 wherein the second reagent is selected from the group consisting of monoethanolamine (MEA), diethanolamine (DEA), and methyldiethanolamine (MDEA).

* * * * *